April 10, 1956     H. J. SCHWARTZ     2,741,556
METHOD OF DESULFURIZING MOLTEN FERROUS METAL
Filed Feb. 5, 1952
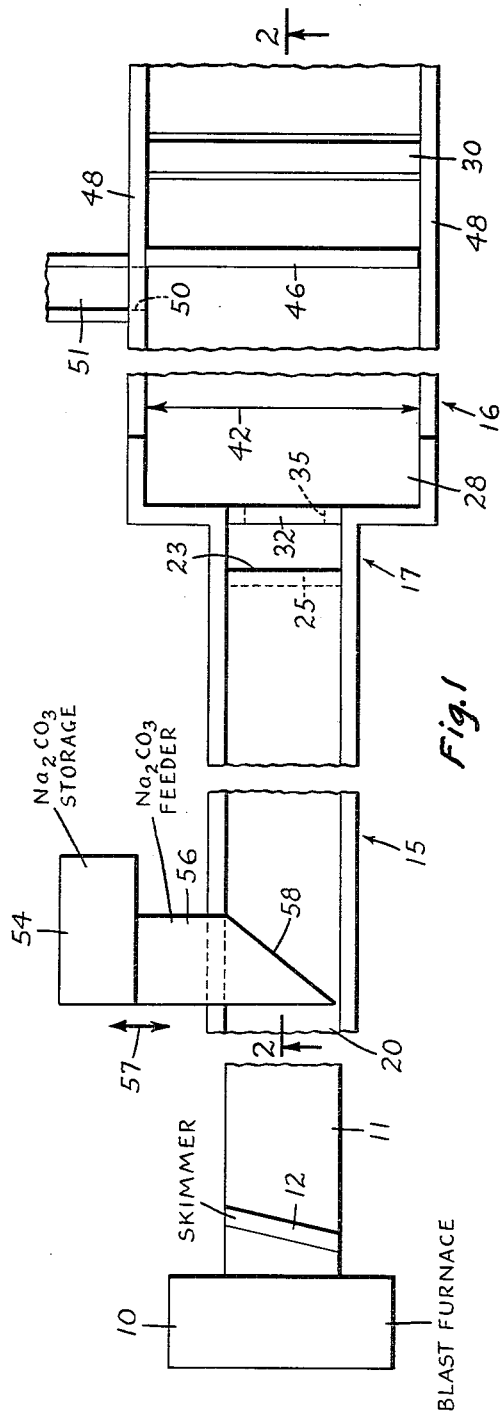
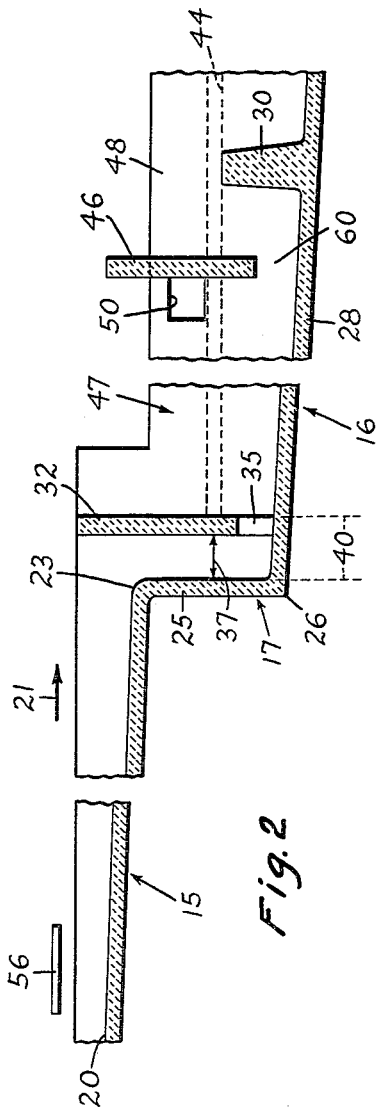
INVENTOR.
HARRY J. SCHWARTZ
BY
ATTORNEY.

United States Patent Office 2,741,556
Patented Apr. 10, 1956

2,741,556

METHOD OF DESULFURIZING MOLTEN FERROUS METAL

Harry J. Schwartz, Pittsburgh, Pa., assignor to Allied Chemical & Dye Corporation, New York, N. Y., a corporation of New York Application February 5, 1952, Serial No. 269,953

1 Claim. (Cl. 75—55)

This invention relates to desulfurization of iron, and is more particularly directed to desulfurizing improvements involving procedure for incorporating in molten ferrous metal desulfurizing agents such as soda ash or caustic soda.

The invention, and the objects and advantages thereof will appear from the following description taken in connection with the accompanying drawing, in which Fig. 1 is a plan view of apparatus by means of which a preferred embodiment of the process of the invention may be carried out, and Fig. 2 is a vertical longitudinal section taken on the line 2—2 of Fig. 1.

Fig. 1 shows diagrammatically a blast furnace 10, blast furnace runner 11, and a skimmer 12 which functions conventionally to remove furnace slag from molten iron passing through runner 11. The exemplified apparatus utilized in carrying out the invention comprises a desulfurizing runner having an upstream section 15, a downstream section 16, and an interposed mixing zone 17. In transverse cross-section, the channel or trough of the desulfurizing runner may be substantially rectangular or provided with slightly outwardly and upwardly flaring sides. Furnace runner 11 is connected to discharge molten iron into the head end 20 of upstream section 15. In the direction of the arrow 21, section 15 is downwardly pitched and at the lower end intersects at 23 the upper end of a vertically disposed wall or drop 25 the base of which connects at 26 with the upper end of the refractory material constituting the bottom 28 of the downstream section 16. The latter is likewise pitched downwardly and is provided at the lower end with a transversely disposed dam 30.

Suitably mounted in the desulfurizing runner in a direction transverse to the flow of molten metal is a preferably vertically disposed dam 32 which, as shown in Fig. 2, terminates substantially short of bottom 28 to provide an orifice 35 which may be rectangular in elevation as viewed transversely of the runner and have a horizontal dimension which may be substantially equal to but is preferably less than the width of the upstream section 15. The vertical dimension of orifice 35 is chosen so that this dimension multiplied by the horizontal dimension affords a cross-sectional area sufficiently large to accommodate any iron flow which may come from the furnace at any given time, it being understood that such flow may be variable. Practice indicates that, in a representative operation, a vertical cross-section area of orifice 35 of about 100 square inches will accommodate any flow likely to occur, say up to twenty tons per minute. That portion of the runner as a whole which lies approximately between the dotted lines 40 of Fig. 2 may be considered as the mixing section or zone 17.

The down-pitch of the bottom 28 of the downstream section is preferably greater than the pitch of upstream section 15, and the transverse dimension 42 of the downstream end of the runner is preferably about 20–40% greater than the corresponding dimension of the upstream section, this increased width of the downstream section 16 affording one means of creating a preferred decreased lineal velocity flow through the downstream section of the runner. The height of dam 30 is preferably such as to afford under "no-flow" conditions a molten metal level 44 such that the no-flow level is substantially higher than the upper edge of orifice 35 so as to maintain under all operating conditions a molten metal seal for the latter. Further, the height of dam 30, transverse dimension 42, and the vertical area of orifice 35 preferably are chosen so that the cross-section area of the metal at the downstream face of dam 32 relates to the vertical area of orifice 35 in the proportion of about 2:1 to 3:1, this situation facilitating turbulence and mixing in the zone immediately adjacent the downstream face of dam 32.

Positioned somewhat upstream from dam 30 is a transversely disposed skimmer 46 the lower edge of which is preferably positioned at an elevation as low or lower than the upper edge of orifice 35. The molten metal pool section formed by dams 32 and 46 and the intervening sides and bottoms of the runner form what may be considered as a desulfurizing and slag separation zone 47. In the vertical side wall 48 of the downstream end of the runner is a port or slot 50 providing for slag run off from the runner into a slag basin 51.

Desulfurizing agents, such as soda ash and caustic soda, commonly used to effect desulfurization of molten ferrous metal have specific gravities much lower than that of the metal and are ordinarily obtainable in comminuted form. While technically substantially anhydrous when manufactured, these materials, at the time of delivery and use, usually have absorbed considerable moisture and have an appreciable water content. Further, during the initial portions of the desulfurizing reactions, the nature of which is well known in the art, these materials evolve copious quantities of gas and vapors, e. g., with sodium carbonate large quantities of $CO_2$ and some steam are given off, and when caustic soda is employed substantial volumes of steam are released. The combination of high operating temperatures, the powdery and low specific gravity characteristics of the treating agent, the large volumes of gas and vapor evolved during the preliminary stages of the desulfurizing operation, and resultant excessive foaming are the basis of conditions which, as are well known in this art, make it extremely difficult to effect satisfactory incorporation of the desulfurizing agent in the molten iron and to obtain good desulfurization.

Because of the foregoing circumstances, many methods have been suggested with respect to procedures for effecting admixture of desulfurizing agents and molten metal. Prior proposals fall into two general classes. The first may be considered as multiple ladle procedures in which for example desulfurizing agent and molten metal are preliminarily mixed in one ladle, the contents of which are then poured into a second mixing and desulfurizing ladle followed by pouring of the treated metal into a third ladle in some such way as to separate out the slag accumulating in the second ladle. While good desulfurization may be obtained, obviously this intermittent batch procedure is not adaptable for use in large scale commercial installations. The second class of treating methods may be designated as runner type operations in which the desulfurizing agent is added to the molten metal at the head end of a runner in which desulfurization is to be effected. Prior art methods of this kind have been based consistently on the thought that since good desulfurization depends upon good mixing of agent and molten iron, such mixing should be effected at the outset of operation and that in some way or other the agent should be fed into and beneath the surface of the molten metal at the head end of the treating runner. Such procedures, while continuous and hence present commercial potentialities, have not been notably satisfactory because of the mechanical difficulties of introducing low specific gravity and powdery material into a very high temperature high specific gravity molten metal, and because of the violent and incipiently explosive evolution of gas during and immediately following initial introduction of the desulfurizing agent into the molten metal. These factors incur irregular operation, unreliable desulfurization and inherently dangerous working conditions.

The present invention is directed to the continuous runner type of operation. In general, it may be said that the unsatisfactory results obtained in practice of prior methods of this nature are attributable largely to the low specific gravity and powdery properties of the treating agent coupled with the tendency of these materials particularly while in the unmelted condition to float on the surface of the molten metal. The instant improvements are based on concepts contrary to the theories and practices of the prior proposals relative to runner type operation. Instead of considering the foregoing properties and characteristics of the treating agents as deficiencies, according to the present invention these properties are recognized as inherently and unavoidably present and are utilized and turned to advantage with the result that not only can good desulfurization be afforded but also the operation may be carried out by the commercially more desirable continuous runner method.

Practice of the invention involves relatively gently and lightly forming or depositing, on the surface of the head end of the upstream section of a continuously moving stream of molten metal in the runner, a thin layer or skin of a solid desulfurizing agent which initially melts under operating conditions and evolves copious quantities of gas during such melting. Following such deposition, the molten metal with the agent floating thereon is flowed thru the upstream section while in relatively non-turbulent quiescent condition for a substantial lineal distance sufficiently long to cause melting of the agent by heat of the metal and to permit substantial subsidence of gassing. Then the molten metal and the agent are intimately mixed, and the flow of the resulting stream of mixed metal and agent is continued thru a downstream section of the runner while the stream is again in a relatively non-turbulent quiescent condition, the distance of flow thru the downstream section being such that the desulfurization reaction proceeds to completion and the resulting desulfurizing slag has an opportunity to rise to the surface of the flowing stream.

The drawing indicates diagrammatically a desulfurizing agent, e. g. sodium carbonate, storage bin 54, and a feeder 56. The arrangement is such that soda ash is continuously fed onto the feeder which is the type which oscillates back and forth as indicated by the double headed arrow 57. It will be noted that the discharge end of the feeder projects out over the entire width of the upper runner section 15 and is provided with an angularly formed discharge edge 58. In operation, the feeder is oscillated within a short cycle of travel, the result of this in conjunction with the shape of the feed edge 58 being such as to effect a continuous sprinkling of soda ash over preferably the entire surface of the head end of the upstream section of molten iron when discharged from blast furnace runner 11 into the treating runner. Rate of operation of feeder 56 is correlated with the rate of flow of molten metal through the treating runner so that there is deposited on the top of the molten metal a body of solid soda ash which, in the better embodiments of the invention, is in the form of an unbroken layer or skin. The thickness of this layer may vary depending upon the quantity of molten metal flowing through the treating runner. In general, the weight of soda ash feed may lie within the range of say 3–10 pounds of soda ash per ton of molten metal. Assuming conditions in which the depth of the metal in section 15 is e. g. 2 to 4 inches, the skin of soda ash may have an average thickness of less than ¼ inch, and in other circumstances where the throughput of molten iron is greater and the depth of the molten iron stream is increased, the thickness of the deposit of soda ash on molten iron may increase proportionally say up to ½ inch or more.

The temperature of molten blast furnace iron may be of the order of 2400–2700° F., and the melting point of soda ash is about 1560° F. The proportion of molten iron to soda ash is so large that adequate quantities of heat are present to melt the soda ash and bring the temperature of the molten ash up to the temperature of the iron without any practical cooling of the iron. Initiation of soda ash melting and evolution of gas takes place immediately on contact of the latter with the iron. However, since the soda ash is relatively evenly and thinly distributed over the surface of the iron, evolution is steady and non-pulsating. Since the soda ash is on top of the iron, escaping gas does not get entrapped in the metal and thereafter released with semi-explosive violence and spattering of molten iron in the immediate vicinity of the runner. During progress of stream flow through the upper section 15, gas evolution takes place steadily and quietly without any objectionable foaming, and corresponding melting of the soda ash takes place. Downflow through upper section 15 is non-turbulent and relatively quiescent, and conditions are such that there is little if any tendency of the soda ash either fused or unfused to mix the molten iron. Such flow of molten iron with the desulfurizing agent floating thereon is continued for a period long enough to effect substantially complete degasification and melting of the treating agent. The lineal length of upper section 15 is dependent largely upon the size of the operation and other variables, and hence it is not feasible to state numerical limits within which the length of section 15 should lie. However, adequacy of lineal run in section 15 may be determined by visual observation, i. e. substantial subsidence of gassing at or about the location of vertical drop 25, substantial subsidence of gassing indicating substantially complete melting of the treating agent.

Another satisfactory way of determining the proper lineal length of upper section 15 is by observation of the conditions of turbulence and gassing in the upper end of the vertical drop. The violent mixing in the drop is conducive to completion of melting and degasification of any residual incompletely degasified and unmelted soda ash flowing into the drop. Thus, a satisfactory length of upper section 15 may be gauged by the substantial absence of objectionable gassing at the head of the vertical drop, i. e. objectionable in the sense of causing enough gassing or spattering of molten iron to be a nuisance to the operators.

The next step of the invention process involves effecting a relatively abrupt and violent admixture of the molten iron and the superjacent treating agent. It has been found that such mixing may be accomplished in a simple but thoroughly practical manner by subjecting the molten iron and the agent to the turbulence of a suddenly imposed "water-fall effect" which may be brought about by the vertical drop formed within the confines of the runner side walls, the vertical wall 25 and the adjacent dam 32. The flow of the molten iron and agent off the lower end of section 15 and into the adjacent face of dam 32 in conjunction with the substantially vertical drop brings about a folding into the stream of metal of all of the molten treating agent. From the bottom of the drop between wall 25 and dam 32 the already well mixed stream is forced thru the orifice 35 which is sufficiently restricted so that the size of the orifice and the flow head created by the vertical drop together act to violently churn and expel the stream into the downstream section of the runner, such ejection thru orifice 35 completing the mixing initiated at the top of the vertical drop.

Immediately after passing thru orifice 35, in accordance with the preferred embodiments of the invention the lineal velocity of the molten iron stream is abruptly and materially reduced, preferably to substantially below the lineal velocity in section 15, and materially below the lineal velocity thru orifice 35. To facilitate this action, the transverse dimension 42 of the downstream section is substantially greater, e. g. about 25% in the specific embodiment presented herein, than the corresponding dimension of the upstream section 15, and dimension 42 is also substantially greater, e. g. about 60%, than the corresponding dimension of orifice 35. As above indicated, one means of creating the preferred decreased lineal velocity flow through downstream section 16 is the relatively wide transverse dimension 42. As an alternative or additional means to facilitate this decreased lineal velocity, the pitch of bottom 28 and the height of dam 30 are designed so that the pool of metal in downstream section or zone 47, even under no-flow conditions, has an average depth substantially greater than the depth of the stream while passing thru the upper section 15. The decrease in velocity brought about in the downstream section and the lineal length of the latter are such as to restore the non-turbulent quiescent flow condition and to effect completion of desulfurization and rise of treating agent, now in the form of a slag, to the surface of the molten metal. In a practical operation, substantial end point of the desulfurizing reaction is indicated by formation and collection of a substantial bank of slag against the upstream side of dam 46. As in the case of the upper section 15, relative to the lineal distance between dam 32 and dam 46, it is not feasible to delineate numerical limits because of the variables involved in different scales of operations. Flow thru section 16 is relatively quiet and in general is at least as quiescent and preferably more so than flow thru upstream section 15. Skimmed metal from upstream of dam 46 flows thru orifice 60 and over dam 30 to points of further processing. Absence of slag in the metal flowing over dam 30 is another convenient way of determining proper spacing of dams 32 and 46.

In a typical operation, the transverse dimension of the channel in upper section 15 may be 24 inches, and the pitch of section 15 may be 0.5 inch per lineal foot in the direction of flow. Molten iron, having a sulfur content by weight of about 0.08%, may be charged from runner 11 into the head end of runner 15 at a rate of about 9 tons per minute, in which instance the stream of molten iron in section 15 may have a depth of about 3 inches, and lineal velocity may be 2 feet/second. Soda ash in quantity of about 7 pounds per ton of metal is fed onto the surface of the metal in upper section 15, in the manner described, so that there is formed on the upper surface of the metal a skin-like coating or layer about 0.2 inch thick. The length of section 15 from head 20 to the vertical wall 25 may be about 10 feet, experience showing that under the conditions exemplified dehydration, degasification, melting and superheating of soda ash are substantially complete when an increment of the stream hits dam 32.

In the embodiment being illustrated, the distance between adjacent faces of wall 25 and dam 32 may be 8–10 inches, wall 25 may be 18 inches high, the vertical dimension of orifice 35 may be about 5 inches, the horizontal dimension 42 may be 30 inches, and the horizontal dimension of orifice 35 may be 18–19 inches, this dimension being desirably not in excess of the transverse dimension of the channel of upper section 15, and preferably about 20–30% less. The height of dam 30 may be such that at "no-flow" condition the molten iron level approximates 2 inches above the upper horizontal edge of orifice 35. The pitch of bottom 28 of section 16 may be one inch per lineal foot, and under no-flow conditions the depth of metal in the pool in zone 47 may be about 7 inches at dam 32 and about 17 inches at dam 46. Experience shows that, in the modification discussed lineal velocity of the stream in zone 47 may be about 0.33 feet/second, and a lineal distance of about 10 feet between dams 32 and 46 is satisfactory to effect completion of desulfurization and collection of resulting slag by dam 46. The slag-free iron overflowing dams 30 may have a sulfur content of about 0.03% by weight, i. e. a percent overall desulfurization of about 60%.

I claim:

The method of desulfurizing molten ferrous metal in a runner operation which comprises continuously flowing said metal through a runner as a stream including an upstream section, a mixing section and a downstream section, continuously forming on substantially the entire surface of the metal at the head of the upstream section a thin skin-like layer of initially solid finely divided desulfurizing agent which has a specific gravity much less than that of the metal and tends to float thereon and which preliminarily melts under operating conditions and evolves copious quantities of gas during melting, flowing said metal and the agent floating thereon through said upstream section while in relatively non-turbulent quiescent condition for a substantial lineal distance, then intimately mixing said metal and agent, said lineal distance being sufficient to cause melting of said agent and degasification thereof to an extent such that during such mixing no objectionable gassing is effected, effecting said mixing by subjecting said stream and agent to the turbulence of a suddenly imposed vertical drop through a restricted conduit followed by flow through a substantially more restricted, molten-metal-sealed orifice, then continuing the flow of the resulting stream through said downstream section while in relatively non-turbulent quiescent condition, and at flow depth greater than that in said upstream section and sufficient to maintain said seal, and at lineal velocity substantially less than that of flow of the metal in said upstream section, and for a substantial lineal distance sufficient to permit desulfurizing material to rise to the surface of said stream, and continuously removing slag from the surface of said stream at the exit of said downstream section.

References Cited in the file of this patent

UNITED STATES PATENTS

| 1,590,730 | Evans | June 29, 1926 |
| 2,089,222 | Payne | Aug. 10, 1937 |
| 2,302,999 | O'Brien | Nov. 24, 1942 |
| 2,459,256 | White et al. | Jan. 18, 1949 |

OTHER REFERENCES

Desulphurization of Molten Iron with Soda Ash etc., published in the Proceedings of the Blast Furnace & Raw Materials Committee of the A. I. M. E., vol. 1 (1942), pages 68–92, pages 72, 76 and 77 are pertinent.